Nov. 2, 1948.  H. R. GREENLEE  2,452,650
SPEED CLUTCH REGULATION OF FAN
AND PUMP FOR COOLING SYSTEMS
Filed Aug. 6, 1945
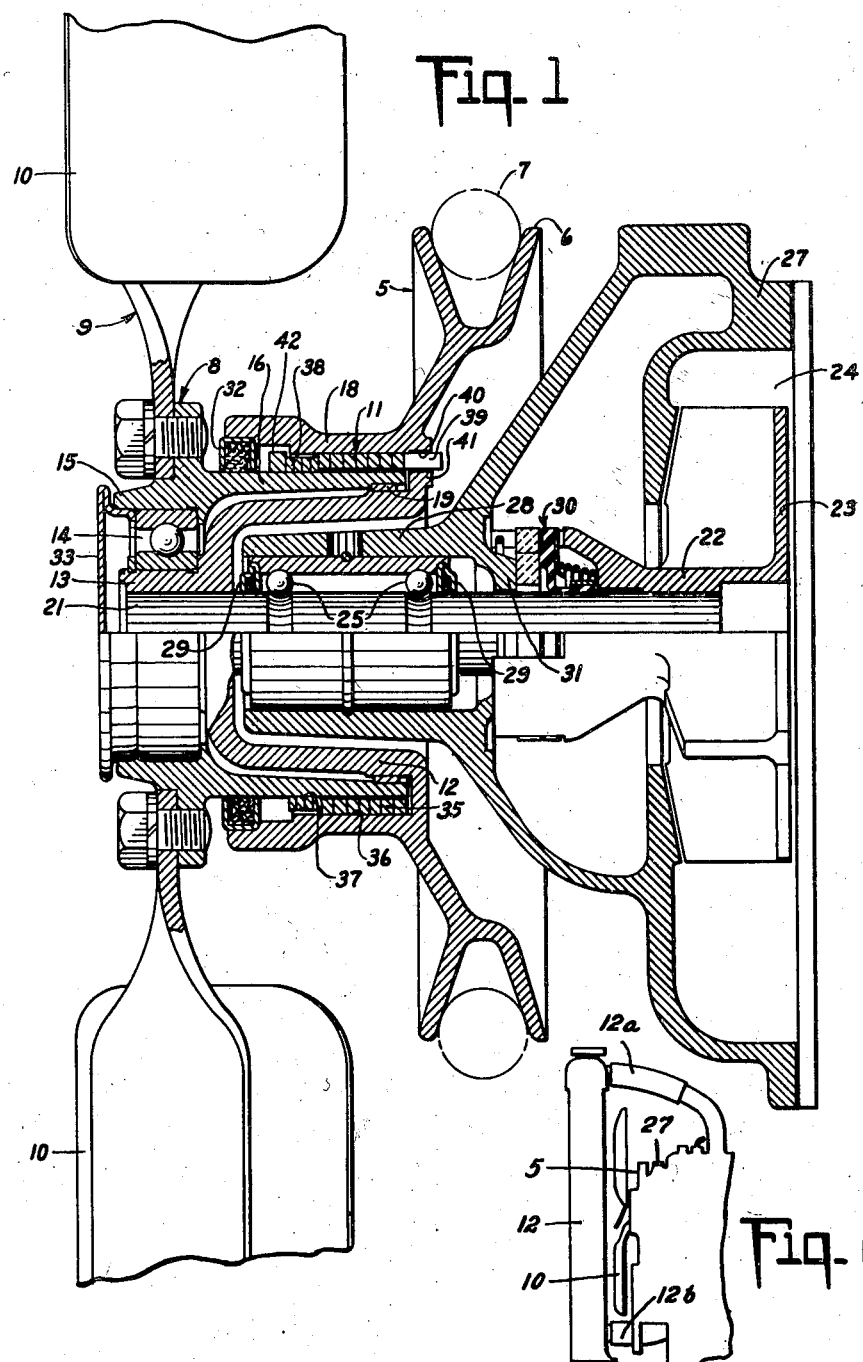
INVENTOR.
Harry R. Greenlee
BY

Patented Nov. 2, 1948

2,452,650

UNITED STATES PATENT OFFICE 2,452,650

SPEED CLUTCH REGULATION OF FAN AND
PUMP FOR COOLING SYSTEMS

Harry R. Greenlee, Indianapolis, Ind., assignor to
The Studebaker Corporation, South Bend, Ind.,
a corporation of Delaware Application August 6, 1945, Serial No. 609,271

4 Claims. (Cl. 123—175)

The present invention relates to an improvement in a clutch, and more particularly to a clutch for controlling the rotation of a fan for cooling fluid of a circulating cooling system of an internal combustion engine or the like in response to the speed of rotation of the engine.

In the operation of a motor vehicle having an internal combustion engine as the motive power extensive heat is generated at slow speed which the present known circulatory cooling systems are incapable of adequately dissipating without the use of a fan or the like for causing a stream of cooling air to flow through a radiator which forms a part of a circulatory cooling system for the engine. However, when the vehicle attains high speeds the circulatory cooling system is adequate of itself to effectively cool the engine so that operation of the fan at such speeds is not necessary. So far as I am aware, in the arrangements of the fans and circulatory systems of today no provision is made for disengaging the fans at the speeds of the vehicle in which their operation is not necessary. The continuously driven fans of the prior art thus tend to decrease the temperature of the water of the circulatory cooling system below the most efficient operating temperature for the engine, and in addition by their continuous operation utilize motive force developed by the engine which otherwise might be used in propelling the vehicle. Thus, by continuously driving the fan a certain amount of force is needlessly expended which otherwise might add to the efficiency of the machine.

It is an object of my present invention therefore to provide means for controlling the operation of a fan of an internal combustion engine or the like in response to speed of rotation of the engine.

A further object is to provide a clutch adapted to be actuated in response to the speed of rotation of an internal combustion engine or the like for controlling the operation of a fan for cooling the fluid in a circulatory cooling system for the engine.

A still further object is to provide a driving means, a driven means carrying a fan for cooling the fluid in a circulatory cooling system of an internal combustion engine or the like, and clutch means between the driving and driven means for controlling the operation of the fan in response to speed of rotation of the driving means.

I propose to attain the aforesaid object by providing driving and driven means, in which the driving means is preferably associated with a pump for circulating the cooling medium in a circulatory cooling system of an internal combustion engine or the like and in which the driven means comprises a fan. Clutch means is provided between the driving and driven means and normally clutches the driven means to the driving means so that the fan is normally rotated, and which clutch means is operable by centrifugal force in response to a predetermined speed of rotation of the driving means for causing disengagement of the driven means from the driving means, whereby the fan is rendered inoperative. The clutch means is of a character for causing disengagement of the driving and driven means at a predetermined speed of rotation of the driving means at which speed of rotation of the driving means the vehicle propelled by the motor has attained a sufficient speed in which the cooling medium of the circulatory cooling system of the engine is effectively cooled without the use of a fan.

A feature of the preferred form of my invention resides in the provision of a clutch of the known coil spring type which is adapted to be positioned between friction or clutch surfaces of the driving and driven means, which spring clutch has a number of its convolutions normally prestressed so as to effect engagement of a clutch surface of the driven means to clutch the driving and driven means together, and which prestressed convolutions upon a predetermined speed of rotation of the driving means are disengaged from the clutch surface of the driven means to effect disengagement of the latter from said driving means.

A further preferred feature resides in providing the driving and driven means with spaced apart and overlapping clutch surfaces between which the coil spring clutch is disposed so that the mechanism occupies a small amount of space whereby it may be incorporated with a motor vehicle or the like without interfering with the compactness and design of the vehicle body.

Other objects and advantages of my invention will appear from the detail description.

Now, in order to acquaint those skilled in the art with the manner of constructing and utilizing a device in accordance with my invention, I shall describe in connection with the accompanying drawing a preferred embodiment of my invention.

In the drawing:

Figure 1 is a vertical sectional view of a device constructed in accordance with my invention and illustrating the manner with which it may be incorporated with the forward end of an internal combustion engine; and Figure 2 is a diagrammatic view illustrating the manner in which the device of my invention is embodied in a conventional form of cooling system for an internal combustion engine of an automotive vehicle.

In the drawing I have shown a driving means 5 comprising in part a sheave or pulley 6 which is adapted to have driving connection as by a belt 7 with the crankshaft or other driving shaft of an internal combustion engine in a manner well known in the art. A driven means 8 comprises a fan 9, having at least one pair of diametrically opposed blades 10. A clutch 11 is disposed between the driving and driven means which clutch is adapted to clutch the driving and driven means together for conjoint rotation or may be caused to disengage the driven means from the driving means so that the fan 9 is not caused to be rotated by the driving means 5. It will be understood that the fan 9, when rotated, is adapted to cause air to flow through a radiator 12 or the like forming a part of a circulatory cooling system including conduits 12a and 12b connecting the radiator 12 with the block of an internal combustion engine, the extreme forward portion of which only is shown in the drawing. The circulatory system for the internal combustion engine may be of any known type which uses water, for example, as a cooling medium. The driving means 5 comprises an intermediate hub or sleeve portion 12 and a reduced cylindrical outer end portion 13 which is journaled in the bearing 14 disposed between the cylindrical end portion 13 and the forwardly or outwardly extending annular sleeve 15 of the driven means 8. The drive means 8 comprises an inwardly or rearwardly extending annular sleeve 16 which overlies and is coaxial with a hub or sleeve portion 12 of the driving means 5. The driving means 5 is also formed with an axially forwardly extending sleeve portion 18 spaced from and overlying the rearwardly extending sleeve 16 of the driven means 8. A ring bearing 19 is disposed between the sleeve or hub portion 12 of the driven means 5 and the inner end of the sleeve 16 of the driven means 8 so that the bearings 14 and 19 provide for rotatably supporting the driven means 8 coaxially of the driving means 5. The reduced cylindrical end portion 13 receives the outer end of a shaft 21 which shaft 21 preferably has a press fit in the bore of the cylindrical extension 13 so that the shaft 21 is rotated with the driving means 5. The shaft 21 at its inner end has a press fit with the hub portion 22 of an impeller 23 disclosed in the pump chamber 24 formed in the pump housing 27 which is disposed at the forward end of an internal combustion engine in a known manner. The shaft 21 is rotatably mounted in a pair of ball bearing races 25 lying between the intermediate portion of the shaft 21 and a collar 28 formed at the forward end of the pump housing 27. Suitable lubricant retaining seals 29 are provided for the bearings 25. A known form of water and lubricant sealing means 30 is arranged between the radially inwardly extending flange 31 at the inner end of collar 28 of the housing 27 and the outer or forward end of the hub portion 22 of the impeller 23.

Also a suitable packing ring 32 is positioned between the outer end of sleeve 18 of the driving means 5 and the sleeve 16 of the driven means 8. An end closure cap 33 fits within the annular outwardly extending sleeve 15 of the driven means 8.

The clutch means 11 preferably comprises a coil spring 35 positioned between the inner cylindrical clutch or friction surface 36 of the sleeve 18 and the external cylindrical clutch or friction surface 37 of the hub or sleeve 16 of the driven means 8. The clutch 11, at its forward or free end portion 38 has a number of convolutions normally pre-stressed into clutching engagement with the outer cylindrical clutch surface 37 of the sleeve 16 of the driven means 8. A weight 42 is suitably fastened to the free or forward end of the coil spring. The other end of the coil spring clutch 11 is provided with a toe portion 39 which extends through a suitable opening 40 provided therefor in a radially extending wall 41 of the driving means 5. The remaining convolutions of the coil spring 35 have the cylindrical surfaces of the convolutions thereof in frictional engagement with the inner cylindrical friction or clutch surface 36 of the sleeve portion 18 of the driving means 5. It will be understood that the toe portion 39 of the spring extending through the opening 40 in the radially extending wall 41 of the driving means 5 provides for rotation of the coil spring clutch 11 with the driving member 5.

The operation of the device above described is as follows:

With the parts in the position shown in the drawing the driving means 5 is adapted to be rotated by the belt 7 which drives the shaft 21 and the impeller 23 carried thereby in the pump chamber 24 to cause circulation of the cooling medium in the circulatory system of an internal combustion engine. The pre-stressed convolutions at the free or forward end of clutch spring 11 are in frictional engagement with the friction surface 37 of the sleeve 16 of the driven means 8 with the remainder of the coils of the coil spring clutch 11 being frictional engagement with the friction or clutch surface 36 of the sleeve 18 of the driving means 5. Now as the driving means 5 starts to rotate it carries with it the coil spring 11. The convolutions of the coil spring 11 at the outer or rearward end thereof in engagement with the friction or clutch surface 36 are caused to be contracted radially inwardly or wrapped down to frictionally engage the friction or clutch surface 37 of sleeve 16 of the driven means 8 throughout the spring clutch length. This contraction of the convolutions of the coil spring 11 normally frictionally engaging clutch surface 36 is occasioned by resistance to movement of the fan blades 10 of the driven means 8 and together with the wrap down or gripping action of the outer convolutions of coil spring 11 which are sufficient to overcome the spring clutch resistance.

Now when the driving means 5 attains a predetermined speed the weight 42 is caused to move radially outward and starts to expand the first prestressed convolution at the free or forward end of the coil spring 11 radially outwardly, and as the speed increases the successive convolutions are no longer gripping sufficiently tight to carry the load, and the driving means 5 loses its clutching engagement with the driven means 8. The convolutions which normally are expanded to engage clutch surface 36 now assume their original positions and the coil spring 11 no longer effects clutching engagement between the driving and driven means. When the speed of rotation of the driving means 5 drops below the predetermined speed of rotation at which the centrifugal force developed is effective to radially throwout the pre-stressed convolutions at the free or forward end of the coil spring 11, the pre-stressed convolutions return to the position shown in the drawing to again engage the clutch surface 37 of the sleeve 16 of the driving means 8 and effect actuation of the clutch 11 as above described to again cause rotation of the fan to direct the cooling blast of air for cooling the fluid in the circulatory system of the internal combustion engine.

While I have shown what I consider to be the preferred embodiment of my invention, it will be understood that various modifications and rearrangements may be made therein without departing from the spirit and scope of my invention.

I claim:

1. In a fluid circulatory system for an internal combustion engine, the combination of driving and driven means comprising coaxially extending cylindrical clutch surfaces, a coil spring arranged between said driving and driven means fixed at one end to said driving means for rotation therewith, a fan adapted to be rotated by said driven means, said coil spring being free at its other end and being adapted to be radially expanded and contracted by centrifugal force in response to the speed of rotation of said driving means for clutching and declutching the clutch surfaces of said driving and driven means.

2. In a fluid circulatory system for an internal combustion engine, the combination of driving and driven means comprising coaxially extending cylindrical clutch surfaces arranged in spaced apart and overlapping relation, a fan adapted to be driven by said driven means for directing a cooling medium for cooling the medium of said circulatory system, a coil spring clutch disposed between the clutch surfaces of said driving and driven means and being fixed at one end to said driving means for rotation therewith, said coil at its other end being pre-stressed to normally engage the clutch surface of said driven means to clutch said driving and driven means together for conjoint rotation, and said other end of said coil being adapted to be expanded radially to be disengaged from the clutch surface of said driven means by centrifugal force upon a predetermined speed of rotation of said driving means.

3. In a fluid circulatory system for an internal combustion engine having a pump chamber, the combination of driving and driven means comprising coaxially extending cylindrical clutch surfaces arranged in spaced apart and overlapping relation, a pump adapted to be disposed in said pump chamber and adapted to be driven by said driving means, a fan adapted to be driven by said driven means for directing a cooling medium for cooling the medium of said circulatory system, a coil spring clutch disposed between the clutch surfaces of said driving and driven means and being fixed at one end to said driving means for rotation therewith, said coil at its other end being pre-stressed to normally engage the clutch surface of said driven means to clutch said driving and driven means together for conjoint rotation, and said other end of said coil being adapted to be radially expanded to be disengaged from the clutch surface of said driven means by centrifugal force upon a predetermined speed of rotation of said driving means.

4. In a fluid circulatory system for an internal combustion engine or the like having a pump chamber, the combination of a driving means comprising a pair of coaxially extending sleeve portions, a shaft fixed at one end to said driving means for rotation therewith and having a pump at its other end adapted to be disposed in said pump chamber, driven means having a sleeve extending coaxially of and between the pair of sleeves of said driving means, said sleeve of said driven means and one of the pair of sleeves of said driving means having clutch surfaces arranged in spaced apart and overlapping relation, a fan drivingly connected to said driven means, bearing means between said driving and driven means for rotatably supporting the latter for rotation upon said driving means, a coil spring clutch disposed between the clutch surfaces of said driving and driven means and being fixed at one end to said driving means for rotation therewith, said coil at its other end being pre-stressed to normally engage the clutch surface of said driven means to clutch said driving and driven means together for conjoint rotation, and said other end of said coil being adapted to be disengaged from the clutch surface of said driven means by centrifugal force upon a predetermined speed of rotation of said driving means.

HARRY R. GREENLEE.

REFERENCES CITED

The following references are of record in the file of this patent:

UNITED STATES PATENTS

| Number | Name | Date |
|---|---|---|
| 1,782,513 | Roos | Nov. 25, 1930 |
| 1,832,726 | Newcomb | Nov. 17, 1931 |